United States Patent
Sasagawa (10) Patent No.: US 11,671,540 B2
(45) Date of Patent: Jun. 6, 2023

(54) INFORMATION PROCESSING APPARATUS AND NON-TRANSITORY COMPUTER READABLE MEDIUM FOR CHANGING DISPLAY ORDER OF RECOGNITION RESULTS BASED ON PREVIOUS CHECKING ORDER

(71) Applicant: FUJIFILM BUSINESS INNOVATION CORP., Tokyo (JP)

(72) Inventor: Shigekazu Sasagawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 433 days.

(21) Appl. No.: 16/831,246

(22) Filed: Mar. 26, 2020

(65) Prior Publication Data
US 2021/0067641 A1 Mar. 4, 2021

(30) Foreign Application Priority Data
Aug. 30, 2019 (JP) .............................. JP2019-158714

(51) Int. Cl.
G06F 40/00 (2020.01)
H04N 1/00 (2006.01)
G06F 40/106 (2020.01)

(52) U.S. Cl.
CPC ....... *H04N 1/00411* (2013.01); *G06F 40/106* (2020.01)

(58) Field of Classification Search
CPC ................................................... G06F 40/106
See application file for complete search history.

(56) References Cited

U.S. PATENT DOCUMENTS

| 8,015,203 | B2 | 9/2011 | Takebe et al. |
| 2004/0057619 | A1* | 3/2004 | Lim ...................... G06V 10/28 |
| | | | 382/176 |
| 2008/0212901 | A1* | 9/2008 | Castiglia .............. G06V 10/987 |
| | | | 382/311 |
| 2010/0017742 | A1* | 1/2010 | Rhodes ................. G06F 3/0482 |
| | | | 715/780 |
| 2011/0131479 | A1* | 6/2011 | Padgett ............... G06F 3/04895 |
| | | | 715/777 |
| 2011/0214067 | A1* | 9/2011 | Tanaka .................. G06F 3/0481 |
| | | | 715/745 |

(Continued)

FOREIGN PATENT DOCUMENTS

| JP | 2000-347777 A | 12/2000 |
| JP | 4998219 B2 | 8/2012 |

*Primary Examiner* — Scott T Baderman
*Assistant Examiner* — Barbara M Level
(74) *Attorney, Agent, or Firm* — Oliff PLC (57) ABSTRACT

An information processing apparatus includes a processor. The processor is programmed to: control a display to display a plurality of recognition results, each recognition result being a recognition result of a document, the document having a plurality of items and an entry field for each item, each recognition result being displayed for each corresponding item of the document; acquire a checking order for each item, the checking order being an order in which each of the displayed recognition results has been checked by a user viewing the displayed recognition results; and change a display order by using the acquired checking order, the display order being an order in which to display a subsequent set of recognition result.

20 Claims, 6 Drawing Sheets

(56) References Cited

U.S. PATENT DOCUMENTS

| 2016/0124931 A1* | 5/2016 | Fan ...................... G06F 3/0481 |
| | | 715/224 |
| 2019/0138592 A1* | 5/2019 | Sareen .................. G06V 30/40 |
| 2020/0184287 A1* | 6/2020 | Meena ................. G06V 30/127 |
| 2020/0250550 A1* | 8/2020 | Bissell ................. G06F 40/174 |

* cited by examiner

*PLEASE FILL IN BOLD BOXES ONLY.
HEISEI __ (YEAR) CHILD ALLOWANCE/SPECIAL BENEFIT CURRENT STATUS NOTIFICATION

| RECIPIENT | (FURIGANA) NAME | FUJI TARO / FUJI TARO | | | |
|---|---|---|---|---|---|
| | ADDRESS PHONE NO. | 6-1 MINATOMIRAI, NISHI WARD, YOKOHAMA, KANAGAWA 123-456-7890 | | | |
| | ADDRESS AS OF JAN. 1, 2015 | ☑ WITHIN WARD ☐ OUTSIDE WARD ☐ OVERSEAS | | | |
| | RECIPIENT'S ATTRIBUTE | ☑ PARENT ☐ GUARDIAN OF MINOR ☐ DESIGNATED PARENT ☐ OTHERS | | | |
| DEPENDENT CHILDREN UNDER 18 | | NAME | RELATIONSHIP | BIRTH DATE | LIVING TOGETHER? |
| | 1 | FUJI MINATO | OFFSPRING | JUN. 26, 2010 | (YES) NO |
| | 2 | FUJI MIRAI | OFFSPRING | DEC. 12, 2013 | (YES) NO |
| | 3 | | | | YES NO |
| | 4 | | | | YES NO |
| | 5 | | | | YES NO |

— 40
— 41
— 42

SCANNED IMAGE/RECOGNITION RESULT — 43

| NAME OF QUESTION | |
|---|---|
| CHILD'S NAME 1 | FUJI MINATO / FUJI MINATO — 44 |
| CHILD'S RELATIONSHIP 1 | OFFSPRING / OFFSPRING — 45 |
| CHILD'S BIRTH DATE 1 | JUN. 26, 2010 |
| ... | |

FIG. 5

*PLEASE FILL IN BOLD BOXES ONLY.
HEISEI __ (YEAR) CHILD ALLOWANCE/SPECIAL BENEFIT CURRENT STATUS NOTIFICATION

| | | | | | | |
|---|---|---|---|---|---|---|
| RECIPIENT | (FURIGANA) NAME | FUJI TARO / FUJI TARO | | | | |
| | ADDRESS PHONE NO. | 6-1 MINATOMIRAI, NISHI WARD, YOKOHAMA, KANAGAWA / 123-456-7890 | | | | |
| | ADDRESS AS OF JAN. 1, 2015 | ☑ WITHIN WARD  ☐ OUTSIDE WARD  ☐ OVERSEAS | | | | |
| | RECIPIENT'S ATTRIBUTE | ☑ PARENT  ☐ GUARDIAN OF MINOR  ☐ DESIGNATED PARENT  ☐ OTHERS | | | | |
| DEPENDENT CHILDREN UNDER 18 | | NAME | RELATIONSHIP | BIRTH DATE | LIVING TOGETHER? | |
| | 1 | FUJI MINATO | OFFSPRING | JUN. 26, 2010 | (YES) | NO |
| | 2 | FUJI MIRAI | OFFSPRING | DEC. 12, 2013 | (YES) | NO |
| | 3 | | | | YES | NO |
| | 4 | | | | YES | NO |
| | 5 | | | | YES | NO |

— 40
— 41

43 — 44 — 45 —

42 —

| NAME OF QUESTION | SCANNED IMAGE/RECOGNITION RESULT | |
|---|---|---|
| RECIPIENT'S NAME | FUJI TARO | |
| | FUJI TARO | |
| CHILD'S NAME 1 | FUJI MINATO | CHILD'S NAME 2 | FUJI MIRAI |
| | FUJI TARO | | FUJI MIRAI |
| CHILD'S RELATIONSHIP 1 | OFFSPRING | CHILD'S RELATIONSHIP 2 | OFFSPRING |
| | OFFSPRING | | OFFSPRING |
| CHILD'S BIRTH DATE 1 | ... | CHILD'S BIRTH DATE 2 | ... |

*PLEASE FILL IN BOLD BOXES ONLY.
HEISEI __ (YEAR) CHILD ALLOWANCE/SPECIAL BENEFIT CURRENT STATUS NOTIFICATION

| RECIPIENT | (FURIGANA) NAME | FUJI TARO / FUJI TARO | | | | |
|---|---|---|---|---|---|---|
| | ADDRESS PHONE NO. | 6-1 MINATOMIRAI, NISHI WARD, YOKOHAMA, KANAGAWA / 123-456-7890 | | | | |
| | ADDRESS AS OF JAN. 1, 2015 | ☑ WITHIN WARD ☐ OUTSIDE WARD ☐ OVERSEAS | | | | |
| | RECIPIENT'S ATTRIBUTE | ☑ PARENT ☐ GUARDIAN OF MINOR ☐ DESIGNATED PARENT ☐ OTHERS | | | | |
| DEPENDENT CHILDREN UNDER 18 | | NAME | RELATIONSHIP | BIRTH DATE | LIVING TOGETHER? | |
| | 1 | FUJI MINATO | OFFSPRING | JUN. 26, 2010 | YES | NO |
| | 2 | FUJI MIRAI | OFFSPRING | DEC. 12, 2013 | YES | NO |
| | 3 | | | | YES | NO |
| | 4 | | | | YES | NO |
| | 5 | | | | YES | NO |

SCANNED IMAGE/RECOGNITION RESULT

| NAME OF QUESTION | |
|---|---|
| CHILD'S NAME 1 | FUJI MINATO |
| | FUJI MINATO |
| CHILD'S RELATIONSHIP 1 | OFFSPRING |
| | OFFSPRING |
| CHILD'S BIRTH DATE 1 | JUN. 26, 2010 |
| ... | |

FIG. 8

INFORMATION PROCESSING APPARATUS AND NON-TRANSITORY COMPUTER READABLE MEDIUM FOR CHANGING DISPLAY ORDER OF RECOGNITION RESULTS BASED ON PREVIOUS CHECKING ORDER

CROSS-REFERENCE TO RELATED APPLICATIONS

This application is based on and claims priority under 35 USC 119 from Japanese Patent Application No. 2019-158714 filed Aug. 30, 2019.

BACKGROUND

(i) Technical Field

The present disclosure relates to an information processing apparatus, and a non-transitory computer readable medium.

(ii) Related Art

Japanese Unexamined Patent Application Publication No. 2000-347777 discloses a method for displaying a data entry screen used in entering data written on a medium while displaying information on the display of a terminal apparatus. With the method, a screen including an image display area and an item entry area is displayed on the display. The image display area displays a portion of a scanned image of the medium that includes at least one item to be entered. The item entry area displays entry fields specific to individual items to be entered. Upon each entry of data into one entry field in the item entry area, the image displayed in the image display area is automatically scrolled to display a portion of the image including the item to be displayed next.

When checking and correcting items in a document read through an optical character recognition (OCR) process, each user may, in some cases, check and correct such items in a different order while checking areas in the read document related to each item being corrected.

In this regard, displaying items in the order of their arrangement in the document has the following problem. If the user corrects an item while checking areas in the read document related to the item being corrected, this results in frequent movements between the related areas. Such a checking process is cumbersome, making it difficult to reduce the burden associated with the checking process.

SUMMARY

Aspects of non-limiting embodiments of the present disclosure relate to an information processing apparatus and a non-transitory computer readable medium with which, in checking a document, the burden associated with checking each item in the document may be reduced as compared with when items are displayed in the order of their arrangement in the document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor programmed to: control a display to display a plurality of recognition results, each recognition result being a recognition result of a document, the document having a plurality of items and an entry field for each item, each recognition result being displayed for each corresponding item of the document; acquire a checking order for each item, the checking order being an order in which each of the displayed recognition results has been checked by a user viewing the displayed recognition results; and change a display order by using the acquired checking order, the display order being an order in which to display a subsequent set of recognition result.

BRIEF DESCRIPTION OF THE DRAWINGS

Exemplary embodiments of the present disclosure will be described in detail based on the following figures, wherein:

FIG. 7 is a schematic illustration of an exemplary checking and correction screen displayed by an information processing apparatus according to a second exemplary embodiment.

DETAILED DESCRIPTION

First Exemplary Embodiment

An exemplary embodiment of the present disclosure will be described below in detail with reference to the drawings. The following description will be directed to an exemplary case in which an information processing apparatus 3 according to a first exemplary embodiment is a server that manages data obtained by reading a document. However, this is not to be construed restrictively. For example, the information processing apparatus 3 may be incorporated in a multifunction machine having print, copy, scan, facsimile, and other functions, or may be incorporated in a terminal such as a personal computer to which a scanner is connected.

Figure 1:
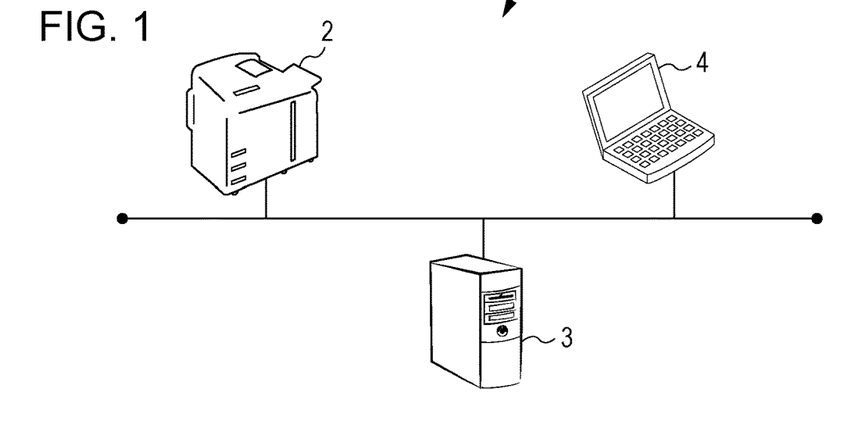
FIG. 1 is a diagram of an exemplary configuration of an information processing system according to exemplary embodiments.

FIG. 1 is a diagram of an exemplary configuration of an information processing system 1 according to the first exemplary embodiment. As illustrated in FIG. 1, the information processing system 1 according to the first exemplary embodiment includes a multifunction machine 2, the information processing apparatus 3, and a terminal 4 that are connected to a network.

The multifunction machine 2 has a scan function. The multifunction machine 2 scans a document having an entry field provided for each individual item, and transmits the scanned image data to the information processing apparatus 3.

The information processing apparatus 3 extracts the following pieces of information from image data read by the multifunction machine 2: image data obtained by item-by-item scanning; and character strings obtained as a result of OCR performed on an item-by-item basis (to be referred to as "recognition results" hereinafter). The information processing apparatus 3 also transmits the following pieces of information to the terminal 4: the scanned image data of a document; item-by-item image data extracted from the image data; and character strings extracted from the image data.

The terminal 4 displays the following pieces of information received from the information processing apparatus 3: image data, item-by-item image data, and item-by-item character strings. The user operates the terminal 4 to perform a process of checking and correcting item-by-item image data and item-by-item character strings (to be referred to as "checking and correction process" hereinafter).

The foregoing description of the first exemplary embodiment is directed to the case in which scanned item-by-item image data, and item-by-item recognition results are displayed on the terminal 4. However, this is not to be construed restrictively. Alternatively, a monitor may be connected to the information processing apparatus 3, and scanned item-by-item image data and item-by-item recognition results may be displayed on the information processing apparatus 3.

For ease of explanation, the following description will be directed to a case in which the information processing apparatus 3 includes a monitor to display scanned item-by-item image data, and item-by-item recognition results, and the user performs a checking and correction process via the information processing apparatus 3.

Figure 2:
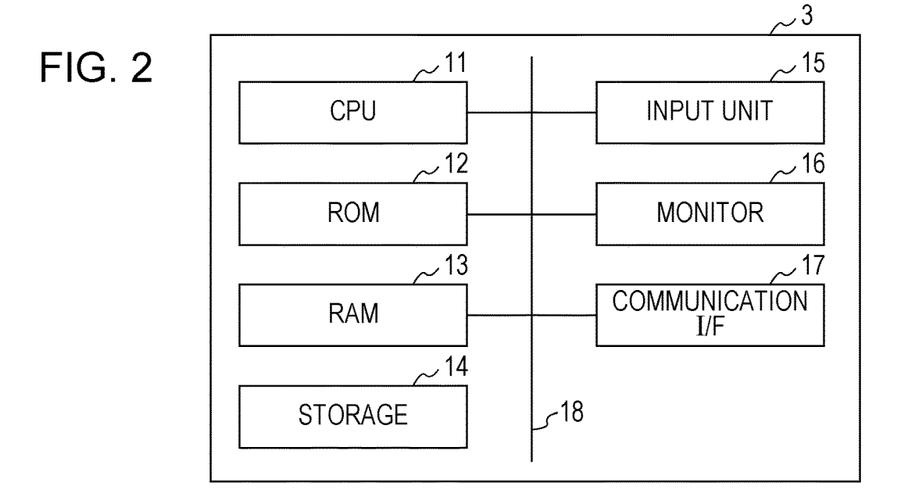
FIG. 2 is a block diagram illustrating an exemplary hardware configuration of an information processing apparatus according to exemplary embodiments.

FIG. 2 is a block diagram illustrating an exemplary hardware configuration of the information processing apparatus 3 according to the first exemplary embodiment. As illustrated in FIG. 2, the information processing apparatus 3 according to the first exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are interconnected by a bus 18. The CPU 11 is an example of a processor.

The CPU 11 controls the entire information processing apparatus 3 in a centralized manner. The ROM 12 stores various programs including an information processing program, data, and other information that are used in the first exemplary embodiment. The RAM 13 is a memory used as a work area during execution of various programs. The CPU 11 loads a program stored in the ROM 12 into the RAM 13, and executes the program to thereby extract and store information such as item-by-item image data. The storage 14 is, for example, a hard disk drive (HDD), a solid state drive (SSD), or a flash memory. The storage 14 may store an information processing program or other information. The input unit 15 is a keyboard or a mouse to accept an input of, for example, a character or a selection. The monitor 16 displays image data or other information. The communication I/F 17 transmits and receives data.

Figure 3:
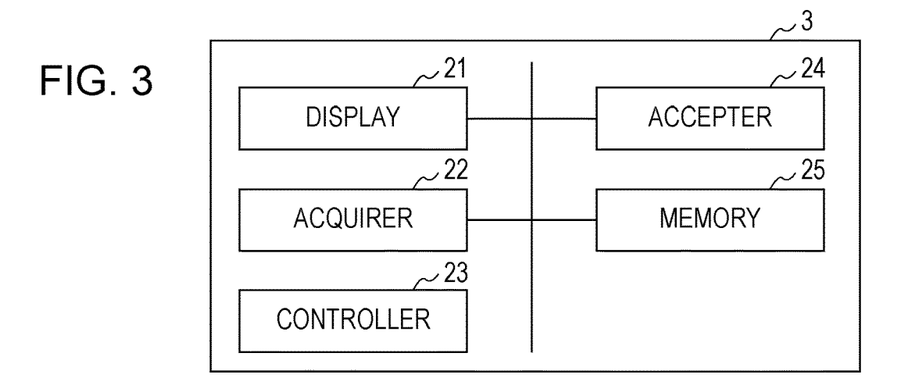
FIG. 3 is a block diagram illustrating an exemplary functional configuration of an information processing apparatus according to exemplary embodiments.

The functional configuration of the information processing apparatus 3 will be described below with reference to FIG. 3. FIG. 3 is a block diagram illustrating an exemplary functional configuration of the information processing apparatus 3 according to the first exemplary embodiment.

As illustrated in FIG. 3, the information processing apparatus 3 includes a display 21, an acquirer 22, a controller 23, an accepter 24, and a memory 25. As the CPU 11 executes the information processing program, the CPU 11 functions as the display 21, the acquirer 22, the controller 23, the accepter 24, and the memory 25.

The display 21 displays recognition results on an item-by-item basis, each recognition result representing the recognition result of a document having an entry field provided for each item.

The acquirer 22 acquires, on an item-by-item basis, the order in which each displayed item-by-item recognition result has been checked (to be referred to as "checking order" hereinafter).

The controller 23 uses the acquired checking order to change the order of display of the item-by-item recognition results (to be referred to as "display order" hereinafter). The controller 23 displays individual recognition results in association with each other based on the relation between the recognition results. The above-mentioned relation is the subordination relation between individual recognition results. More specifically, if the checking order of individual recognition results has a precedence relation, the controller 23 associates the recognition results with each other as a subordination relation.

In displaying individual recognition results, the controller 23 switches between displaying the recognition results in a predetermined order, and displaying the recognition results in a changed order, and also switches whether to acquire the checking order. The controller 23 displays image data obtained by reading a document. At this time, the controller 23 displays checked and unchecked areas in the displayed image data in a distinguishable manner, which are respectively an area in the image data corresponding to a recognition result that has been checked and an area in the image data corresponding to a recognition result that has not been checked yet.

The accepter 24 accepts, if the display order and the acquired checking order differ, a selection of whether to reflect the checking order on the display order. If, as a result of the recognition results being displayed plural times with the checking order reflected on the display order, the recognition results have been displayed in the same display order a predetermined number of times, the accepter 24 accepts a selection of whether to reflect the display order of the individual recognition results on the display order for the next time onwards.

The memory 25 stores acquired image data, item-by-item image data, item-by-item recognition results, corrected item-by-item checking results, and item-by-item checking order.

Figure 4:
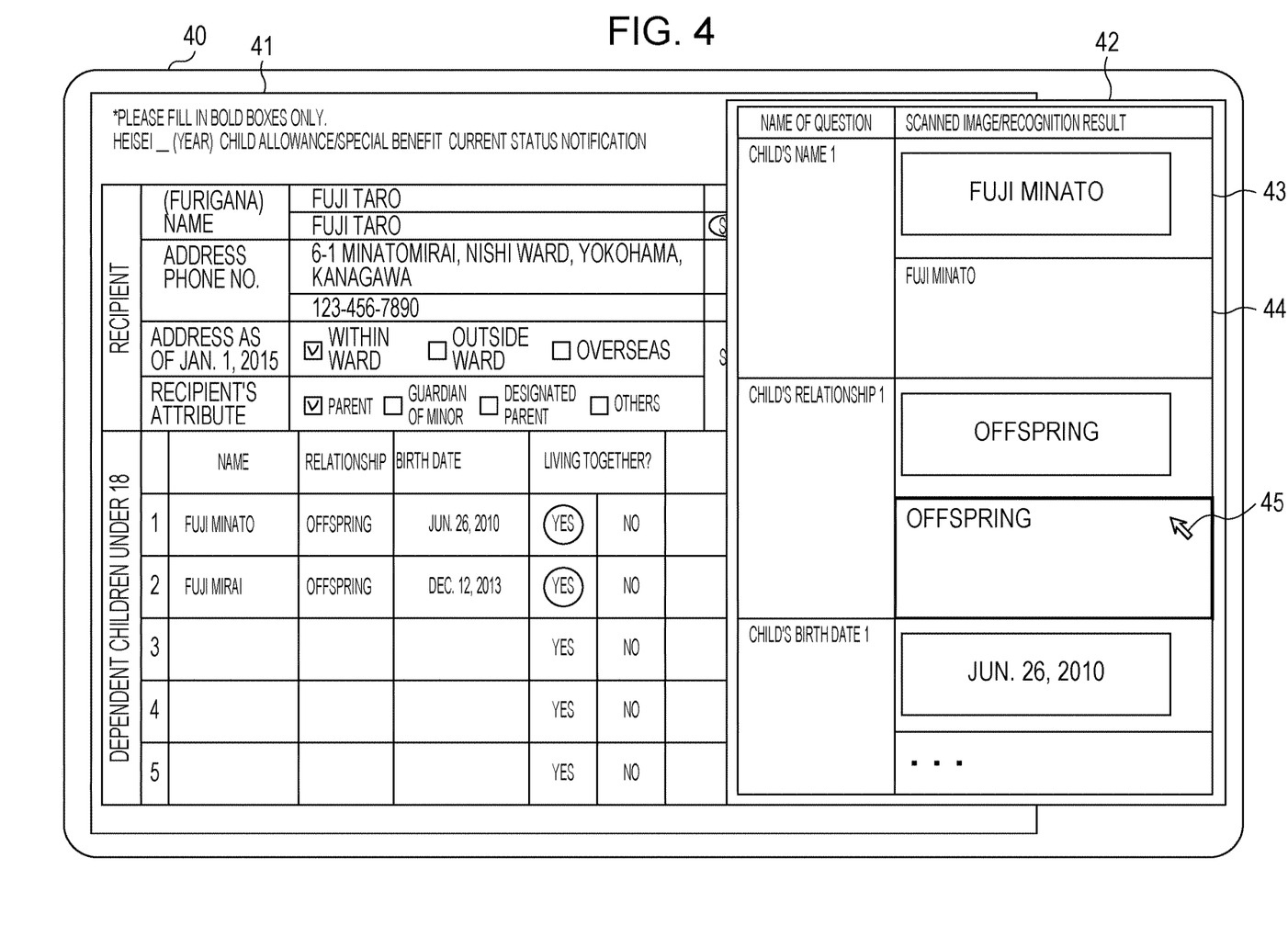
FIG. 4 is a schematic illustration of an exemplary checking and correction screen displayed by an information processing apparatus according to a first exemplary embodiment.
Figure 5:
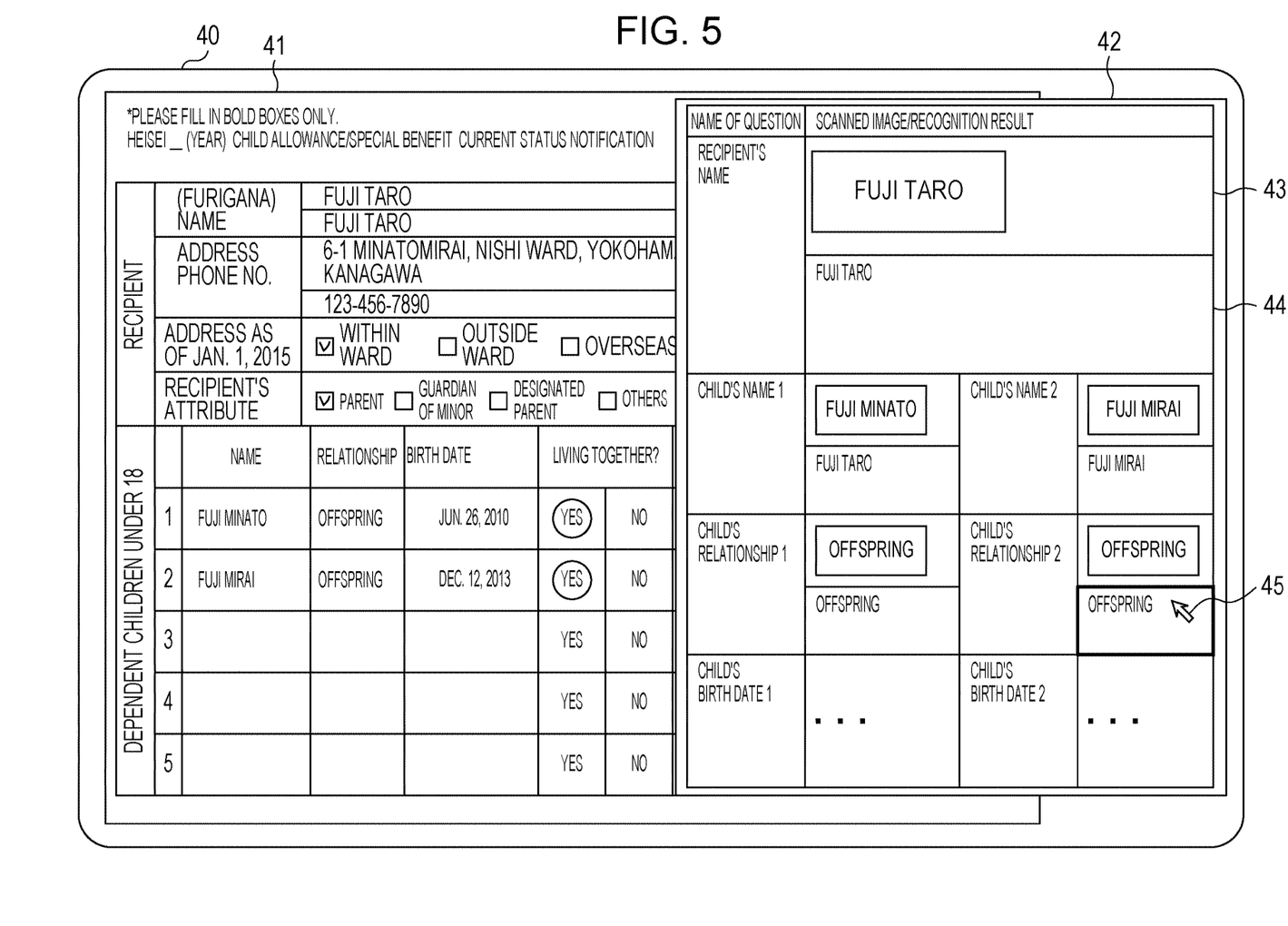
FIG. 5 is a schematic illustration of an exemplary checking and correction screen displayed by an information processing apparatus, which is used to explain the relation between item-by-item recognition results according to exemplary embodiments.

Before describing operation of the information processing apparatus 3, the following describes, with reference to FIGS. 4 to 5, a method employed by the information processing apparatus 3 to acquire the checking order and change the display order of recognition results.

A checking and correction screen used in performing a checking and correction process will be described below with reference to FIG. 4. FIG. 4 is a schematic illustration of an exemplary checking and correction screen displayed by the information processing apparatus 3 according to the first exemplary embodiment.

As illustrated in FIG. 4, the information processing apparatus 3 displays the following pieces of information on a checking and correction screen 40: image data 41 that has been acquired; and item-by-item image data 43 and item-by-item recognition results 44 that are displayed in a checking and correction display area 42, which is a display area used for checking and correcting information. A click on each item-by-item recognition result 44 enables entry of information, thus allowing a correction to be made to the character string displayed within the recognition result 44. When a cursor 45 operated with a mouse or other device is placed over the area where the recognition result 44 is displayed, this causes a change in the display color of the area where the recognition result 44 is displayed (which will be referred to as "mouse-over" hereinafter). The information processing apparatus 3 acquires, on an item-by-item basis, the order in which each item-by-item recognition result 44 has received a mouse-over event, and stores the acquired order as the checking order. For example, if "Child's Name 1", "Child's Relationship 1", and "Child's Birth Date 1" have received a mouse-over event in this order with the cursor 45 placed over these items, the information processing apparatus 3 stores "1" for "Child's Name 1", "2" for "Child's Relationship 1", and "3" for "Child's Birth Date 1" as information indicating that these items have been checked in this order.

The information processing apparatus 3 uses the item-by-item checking order to learn the checking order of individual items and their cross-reference relation. For example, if the item-by-item checking order and the item-by-item display order differ, the information processing apparatus 3 learns, for example, the item-by-item checking order, frequently checked items, and the precedence relation for the checking order between items, and creates a learning model used for changing the display order. The information processing apparatus 3 stores the created learning model for each individual document on which OCR has been performed. When OCR is to be performed on the same document for the next time onwards, the information processing apparatus 3 uses the created learning model to change the order in which to display individual recognition results.

The foregoing description of the first exemplary embodiment is directed to the case in which the cursor 45 is placed over the area where each recognition result 44 is displayed. However, this is not to be construed restrictively. In one example, the item-by-item image data 43, and the item-by-item recognition results 44 may be displayed on a head mount display or other such display, and the gaze directed toward each item-by-item recognition result 44 may be detected to acquire the order in which each individual item has been checked. In another example, the item-by-item image data 43 and the item-by-item recognition results 44 may be displayed on a portable terminal such as a tablet, and tapped item-by-item recognition results 44 may be detected to acquire the checking order.

The information processing apparatus 3 performs learning by using the acquired checking order, and changes the display order. In one example, as illustrated in FIG. 4, the checking and correction screen 40 displays the item-by-item image data 43 and the corresponding item-by-item recognition results 44 such that these pieces of information are vertically arranged in a line. However, this is not to be construed restrictively. Depending on the relation between individual items, the item-by-item image data 43, and the corresponding item-by-item recognition results 44 may be displayed in parallel.

The following describes, with reference to FIG. 5, a checking and correction screen on which the item-by-item image data 43 and the corresponding item-by-item recognition results 44 are displayed in parallel in performing a checking and correction process. FIG. 5 is a schematic illustration of an exemplary checking and correction screen displayed by the information processing apparatus 3, which is used to explain the relation between the item-by-item recognition results 44 according to the first exemplary embodiment.

As illustrated in FIG. 5, the information processing apparatus 3 displays the following pieces of information on the checking and correction screen 40: the image data 41 that has been acquired; and the item-by-item image data 43 and the item-by-item recognition results 44 that are displayed in the checking and correction display area 42. The following describes an exemplary case in which the information processing apparatus 3 has acquired the checking order as follows: "Recipient's Name", "Child's Name 1", "Child's Relationship 1", "Child's Birth Date 1", "Recipient's Name", "Child's Name 2", "Child's Relationship 2", and "Child's Birth Date 2", and reflected the acquired checking order on a learning model. If an item has been checked plural times, the information processing apparatus 3 associates the item that has been checked plural times, with items having a precedence relation with this item.

First, the information processing apparatus 3 associates "Child's Name 1", "Child's Relationship 1", and "Child's Birth Date 1" with "Recipient's Name" as items subordinate to "Recipient's Name". Likewise, the information processing system 1 associates "Child's Name 2", "Child's Relationship 2", and "Child's Birth Date 2" with "Recipient's Name" as items subordinate to "Recipient's Name". Next, the information processing apparatus 3 displays "Recipient's Name" as a superordinate item. The information processing apparatus 3 also displays, as items subordinate to "Recipient's Name", the following two sets of items side by side: "Child's Name 1", "Child's Relationship 1", and "Child's Birth Date 1"; and "Child's Name 2", "Child's Relationship 2", and "Child's Birth Date 2". In this way, the information processing apparatus 3 displays associated items in parallel.

The foregoing description of the first exemplary embodiment is directed to the case in which an association between items is established if an item has been checked plural times. However, this is not to be construed restrictively. Alternatively, items that frequently have precedence relation with each other may be associated with each other as associated items, or the subordination relation between items to be associated with each other may be defined and stored in, for example, a file.

The foregoing description of the first exemplary embodiment is directed to the case in which item-by-item recognition results have subordination relation with each other. However, this is not to be construed restrictively. Items containing different descriptions for the same kind of item may be associated with each other as having a same-kind relation. For example, "Child's Name 1" and "Child's Name 2" are related to the same kind of item "Child's Name" but contain different descriptions. The information processing apparatus 3 may associate items of the same kind with each other, and display the associated items in parallel. The foregoing description of the first exemplary embodiment is directed to the case in which associated items are displayed in parallel. However, this is not to be construed restrictively. Alternatively, associated items may be displayed by using a two-dimensionally rendered graph such as a network graph in which individual items are linked to represent how the items are associated with each other, or by using a three-dimensionally rendered graph such as a dynamical model in which plural items are linked in a non-intersecting structure to represent how the items are associated with each other.

The foregoing description of the first exemplary embodiment is directed to the case in which the display order is changed by using the checking order. However, this is not to be construed restrictively. If the recognition results have been displayed in the same display order plural times, the display order of the recognition results may be reflected on the display order for the next time onwards, or whether to reflect the display order may be selected. More specifically, if "Recipient's Name", "Child's Name 1", and "Child's Birth Date 1" have been displayed in this order a predetermined number of times, the user selects whether to reflect this order, "Recipient's Name", "Child's Name 1", and "Child's Birth Date 1", on the display order for the next time onwards. If the user selects to reflect the display order, then when displaying the item-by-item recognition results 44 for the next time onwards, the information processing apparatus 3 displays the item-by-item image data 43 and the item-by-item recognition results 44 in the order "Recipient's Name", "Child's Name 1", and "Child's Birth Date 1".

Figure 6:
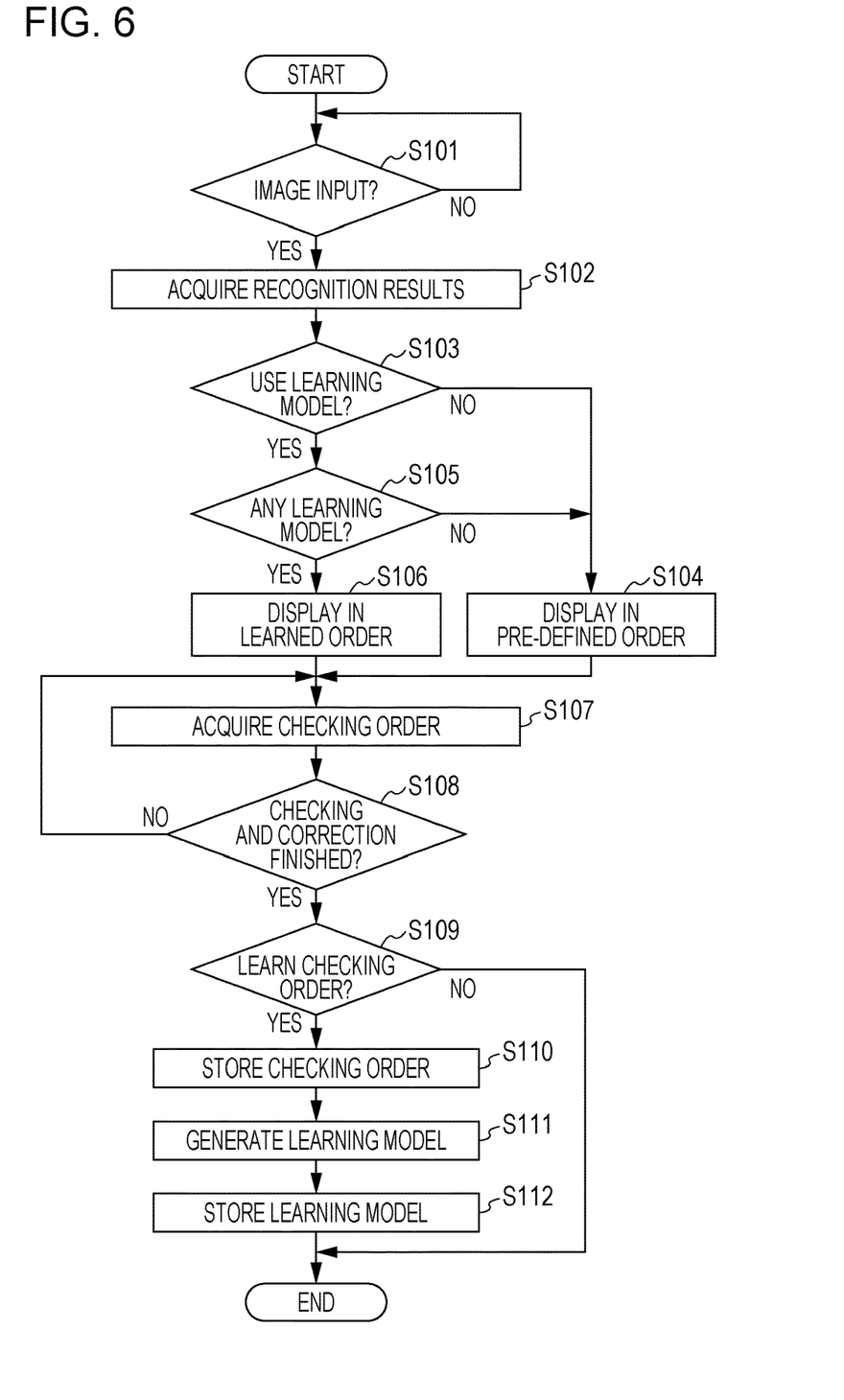
FIG. 6 is a flowchart illustrating exemplary information processing according to the first exemplary embodiment.

The following describes, with reference to FIG. 6, operation of an information processing program according to the first exemplary embodiment. First, FIG. 6 is a flowchart illustrating exemplary information processing according to the first exemplary embodiment. The information processing in FIG. 6 is executed by the CPU 11 reading and executing the information processing program from the ROM 12 or the storage 14. The information processing in FIG. 6 is executed when, for example, the user instructs that the information processing program be executed.

At step S101, the CPU 11 determines whether image data has been input. If image data has been input (step S101: YES), the CPU 11 proceeds to step S102. If no image data has been input (step S101: NO), the CPU 11 waits until image data is input. Together with image data, the following pieces of information are also input at this time: information about the kind of a document; information about whether to use a learning model; information about whether to learn the checking order; and settings information.

At step S102, the CPU 11 performs OCR on the input image data, and acquires recognition results.

At step S103, the CPU 11 determines whether to use a learning model to change the display order. If a learning model is to be used to change the display order (step S103: YES), the CPU 11 proceeds to step S105. If a learning model is not to be used (step S103: NO), the CPU 11 proceeds to step S104.

At step S104, the CPU 11 displays the item-by-item image data 43 and the item-by-item recognition results 44 in the order defined in the settings information. The foregoing description of the first exemplary embodiment is directed to the case in which, if a learning model is not to be used, the item-by-item image data 43 and the item-by-item recognition results 44 are displayed in the order specified in the settings information. However, this is not to be construed restrictively. Alternatively, if a learning model is not to be used, the item-by-item image data 43 and the item-by-item recognition results 44 may be displayed in a predetermined order. For example, the item-by-item image data 43 and the item-by-item recognition results 44 may be displayed in the order in which the corresponding pieces of information are written in the document.

At step S105, the CPU 11 determines whether there is any learning model that matches the input image data. If there is any learning model that matches the input image data (step S105: YES), the CPU 11 proceeds to step S106. If there is no learning model that matches the input image data (step S105: NO), the CPU 11 proceeds to step S104.

At step S106, the CPU 11 calculates the display order by using the learning model, and displays the item-by-item image data 43 and the item-by-item recognition results 44 in the calculated order. At this time, the user checks and corrects the item-by-item image data 43 and the item-by-item recognition results 44.

At step S107, the CPU 11 acquires the checking order in which each item-by-item recognition result 44 has been checked. This step includes acquiring the item-by-item recognition results 44 that have received a mouse-over event, and the order in which each recognition result 44 has received a mouse-over event.

At step S108, the CPU 11 determines whether the user has finished checking and correction. If the user has finished checking and correction (step S108: YES), the CPU 11 proceeds to step S109. If the user has not finished checking and correction (step S108: NO), the CPU 11 proceeds to step S107.

At step S109, the CPU 11 determines whether to learn the checking order by using the acquired checking order, and to create a learning model. If the CPU 11 determines to learn the checking order (step S109: YES), the CPU 11 proceeds to step S110. If the CPU 11 determines not to learn the checking order (step S109: NO), the CPU 11 ends the information processing. The foregoing description of the first exemplary embodiment is directed to the case in which information about whether to learn the checking order is input in advance. However, this is not to be construed restrictively. The user may be allowed to select, if the display order and the checking order differ, whether to reflect the checking order on a learning model.

At step S110, the CPU 11 stores the acquired checking order.

At step S111, the CPU 11 generates a learning model by use of the checking order stored for each piece of image data representing the same document. The foregoing description of the first exemplary embodiment is directed to the case in which a learning model is generated for each piece of image data representing the same document. However, this is not to be construed restrictively. Alternatively, a learning model may be created for each individual user, or a learning model may be created for each individual user and for each piece of image data representing the same document.

At step S112, the CPU 11 stores the generated learning model, and the display order.

As described above, according to the exemplary embodiment, the checking order of individual recognition results 44 is acquired, and a learning model is generated by using the acquired checking order to thereby change the display order. Therefore, in checking a document, the burden associated with checking each item in the document may be reduced as compared with when items are displayed in the order of their arrangement in the document.

Second Exemplary Embodiment

The foregoing description of the first exemplary embodiment is directed to the case in which the item-by-item image data 43 and the item-by-item recognition results 44 are displayed on the checking and correction screen 40 with their display order changed, and the case in which the item-by-item image data 43 and the item-by-item recognition results 44 are displayed in parallel. The following description of a second exemplary embodiment will be directed to a case in which the image data 41 displayed on the checking and correction screen 40 is changed in the way the image data 41 is displayed. The diagram illustrating the configuration of the information processing system 1 according to the second exemplary embodiment (see FIG. 1), the block diagram illustrating the hardware configuration of the information processing apparatus 3 (see FIG. 2), and the block diagram illustrating the functional configuration of the information processing apparatus 3 (see FIG. 3) are the same as those used above with reference to the first exemplary embodiment, and thus will not be described in further detail. The schematic illustration of the checking and correction screen 40 displayed by the information processing apparatus 3 (see FIG. 4), and the schematic illustration of the checking and correction screen 40 displayed by the information processing apparatus 3, which is used to explain the relation between the recognition results 44 (see FIG. 5), are the same as those used above with reference to the first exemplary embodiment, and thus will not be described in further detail.

With reference to FIG. 7, the checking and correction screen 40 used in performing a checking and correction process will be described. FIG. 7 is a schematic illustration of an example of the checking and correction screen 40 displayed by the information processing apparatus 3 according to the second exemplary embodiment. Features in FIG. 7 identical to those of the checking and correction screen 40 illustrated in FIG. 4 will be designated by the same reference signs as those in FIG. 4, and will not be described in further detail.

As illustrated in FIG. 7, the information processing apparatus 3 displays the following pieces of information on the checking and correction screen 40: the image data 41 that has been acquired; the item-by-item image data 43 and the item-by-item recognition results 44 displayed in the checking and correction display area 42; and an unchecked area 46 and a checked area 47 in the acquired image data 41.

The unchecked area 46 is an area in the image data 41 corresponding to those item-by-item recognition results 44 that have not been checked yet. The unchecked area 46 is shaded with vertical lines. The checked area 47 is an area in the image data 41 corresponding to those recognition results 44 that have been checked already. The checked area 47 is shaded in a grid-like pattern. If any item-by-item recognition result 44 has been checked, the information processing apparatus 3 changes how to display an area in the image data 41 corresponding to the checked item-by-item recognition result 44. For example, as illustrated in FIG. 7, if the information processing apparatus 3 determines that "Child's Name 1" has been checked in the checking and correction display area 42, the information processing apparatus 3 changes an area in the image data 41 corresponding to "Child's Name 1" from the unchecked area 46 to the checked area 47.

The foregoing description of the second exemplary embodiment is directed to the case in which the unchecked area 46 is shaded with vertical lines, and the checked area 47 is shaded in a grid-like pattern. However, this is not to be construed restrictively. The unchecked area 46, the checked area 47, and other areas may be displayed with their colors changed, or one of the unchecked area 46 and the checked area 47 may be displayed with shading.

Figure 8:
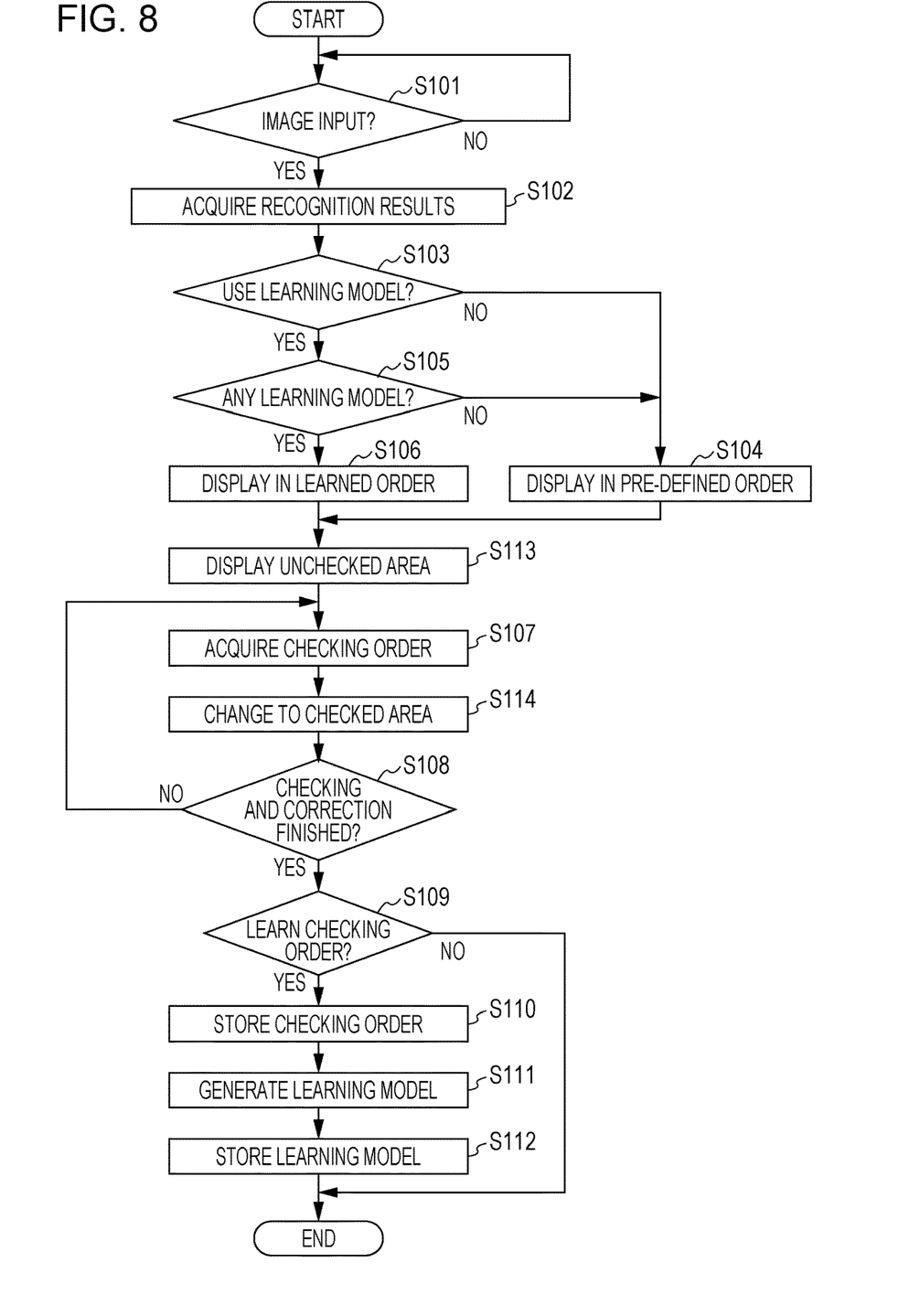
FIG. 8 is a flowchart illustrating exemplary information processing according to the second exemplary embodiment.

The following describes, with reference to FIG. 8, operation of an information processing program according to the second exemplary embodiment. FIG. 8 is a flowchart illustrating exemplary information processing according to the second exemplary embodiment. The information processing in FIG. 8 is executed by the CPU 11 reading and executing the information processing program from the ROM 12 or the storage 14. The information processing in FIG. 8 is executed when, for example, the user instructs that the information processing program be executed. Steps in FIG. 8 identical to the steps in the information processing illustrated in FIG. 6 will be designated by the same reference signs as those in FIG. 6, and will not be described in further detail.

At step S113, the CPU 11 displays the unchecked area 46 within the image data 41 displayed on the checking and correction screen 40, such that the unchecked area 46 is displayed in an area of the image data 41 corresponding to the item-by-item recognition results 44.

At step S114, the CPU 11 displays the checked area 47 within the image data 41 displayed on the checking and correction screen 40, such that the checked area 47 is displayed in an area of the image data 41 corresponding to each item-by-item recognition result 44 that has received a mouse-over event.

As described above, according to the second exemplary embodiment, within the image data 41 displayed on the checking and correction screen 40, an area in the image data corresponding to checked items is changed in the way the area is displayed. This configuration may allow the user to see the progress of a checking process for items whose display order has been changed, thus reducing the burden associated with such a checking process.

The foregoing description of the second exemplary embodiment is directed to the case in which the checking order is learned after a checking and correction process is completed. However, this is not to be construed restrictively. Alternatively, while a checking and correction process is in progress, the checking order may be acquired every time each item-by-item recognition result 44 is checked, and the acquired checking order may be learned.

The configuration of the information processing apparatus 3 described with reference to the above exemplary embodiments is only illustrative, and may be modified according to the circumstances without departing from the scope of the present disclosure.

The procedure of processing executed by the program described with reference to the above exemplary embodiments is also only illustrative. Unnecessary steps may be removed, new steps may be added, or the order of processing may be changed, without departing from the scope of the present disclosure.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Although the foregoing description of the exemplary embodiments above is directed to the case in which the program for processing information is pre-stored (pre-installed) in the storage 14, this is not to be construed restrictively. The program may be provided while being stored in a storage medium, examples of which include a compact disc read only memory (CD-ROM), a digital versatile disc read only memory (DVD-ROM), and a universal serial bus (USB) memory. The program may be downloaded from an external device via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to:
control a display to display a plurality of recognition results from a scanned document having a plurality of items arranged in an fixed order with an entry field for each item, each recognition result being a recognition result of each corresponding item on the scanned document, the plurality of recognition results being displayed in a display order for user's review;
acquire a prior checking order which is an order in which each of the plurality of items on the document has been checked by a prior user viewing then displayed recognition results; and
while the plurality of items on the scanned document are arranged in the fixed order, change the display order of the plurality of recognition results currently displayed on the display based on the acquired prior checking order, such that the display order of the plurality of recognition results becomes different for the same document depending on the acquired prior checking order,
wherein the display is a display of the information processing apparatus or a remotely located display.

2. The information processing apparatus according to claim 1,
wherein if the display order and the acquired prior checking order differ, the processor is programmed to control the display to display a selection that permits the user to select whether to apply the acquired prior checking order to the display order.

3. The information processing apparatus according to claim 2,
wherein if, as a result of the recognition results being displayed a plurality of times with the prior checking order applied to the display order, the recognition results have been displayed in a same display order a predetermined number of times, the processor is programmed to control the display to display a selection that permits the user to select whether to apply the same display order of the recognition results on the display order.

4. The information processing apparatus according to claim 3, wherein the processor is programmed to control the display to display the recognition results in association with each other based on a relation between the recognition results.

5. The information processing apparatus according to claim 4, wherein the relation is a subordination relation between the recognition results.

6. The information processing apparatus according to claim 5, wherein if the prior checking order of the recognition results has a precedence relation, the processor is programmed to associate the recognition results with each other as the subordination relation.

7. The information processing apparatus according to claim 3, wherein in displaying the recognition results, the processor is programmed to switch between displaying the recognition results in a predetermined order, and displaying a subsequent set of recognition results in the changed display order.

8. The information processing apparatus according to claim 3, wherein in displaying the recognition results, the processor is programmed to switch off acquiring the prior checking order in response to a predetermined condition being satisfied.

9. The information processing apparatus according to claim 2, wherein the processor is programmed to control the display to display the recognition results in association with each other based on a relation between the recognition results.

10. The information processing apparatus according to claim 9, wherein the relation is a subordination relation between the recognition results.

11. The information processing apparatus according to claim 10, wherein if the prior checking order of the recognition results has a precedence relation, the processor is programmed to associate the recognition results with each other as the subordination relation.

12. The information processing apparatus according to claim 2, wherein in displaying the recognition results, the processor is programmed to switch between displaying the recognition results in a predetermined order, and displaying a subsequent set of recognition results in the changed display order.

13. The information processing apparatus according to claim 2, wherein in displaying the recognition results, the processor is programmed to switch off acquiring the prior checking order in response to a predetermined condition being satisfied.

14. The information processing apparatus according to claim 1, wherein the processor is programmed to control the display to display the recognition results in association with each other based on a relation between the recognition results.

15. The information processing apparatus according to claim 14, wherein the relation is a subordination relation between the recognition results.

16. The information processing apparatus according to claim 15, wherein if the prior checking order of the recognition results has a precedence relation, the processor is programmed to associate the recognition results with each other as the subordination relation.

17. The information processing apparatus according to claim 1, wherein in displaying the recognition results, the processor is programmed to switch between displaying the recognition results in a predetermined order, and displaying a subsequent set of recognition results in the changed display order.

18. The information processing apparatus according to claim 1, wherein in displaying the recognition results, the processor is programmed to switch off acquiring the prior checking order in response to a predetermined condition being satisfied.

19. The information processing apparatus according to claim 1, wherein the processor is programmed to control the display to display image data of the scanned document, and display a checked area and an unchecked area in the displayed image data in a distinguishable manner, the checked area being an area corresponding to at least one of the recognition results that has been checked, the unchecked area being an area corresponding to at least one of the recognition results that has not been checked yet.

20. A non-transitory computer readable medium storing a program causing a computer to execute a process for processing information, the process comprising:

displaying, on a display, a plurality of recognition results from a scanned document having a plurality of items arranged in an fixed order with an entry field for each item, each recognition result being a recognition result of each corresponding item on the scanned document, the plurality of recognition results being displayed in a display order for user's review;

acquiring a prior checking order which is an order in which each of the plurality of items on the document has been checked by a prior user viewing then displayed recognition results; and while the plurality of items on the scanned document are arranged in the fixed order, changing the display order of the plurality of recognition results currently displayed on the display based on the acquired prior checking order, such that the display order of the plurality of recognition results becomes different for the same document depending on the acquired prior checking order.

* * * * *